United States Patent [19]

Dill et al.

[11] 4,151,098

[45] Apr. 24, 1979

[54] ACIDIZING SUBTERRANEAN WELL FORMATIONS CONTAINING DEPOSITS OF METAL COMPOUNDS

[75] Inventors: Walter R. Dill; John A. Knox, both of Duncan, Okla.

[73] Assignee: Halliburton Company, Duncan, Okla.

[21] Appl. No.: 866,983

[22] Filed: Jan. 5, 1978

[51] Int. Cl.$^2$ .............................................. E21B 43/27
[52] U.S. Cl. ................................ 252/8.55 C; 166/307; 252/180
[58] Field of Search ..................... 252/8.55 C, 8.55 B, 252/180, DIG. 11; 166/307

[56] References Cited

U.S. PATENT DOCUMENTS

| | | | |
|---|---|---|---|
| 3,142,335 | 7/1964 | Dill et al. | 252/8.55 X |
| 3,251,415 | 5/1966 | Bombardieri et al. | 166/307 |
| 3,920,566 | 11/1975 | Richardson et al. | 252/8.55 |

*Primary Examiner*—Herbert B. Guynn
*Attorney, Agent, or Firm*—Thomas R. Weaver; John H. Tregoning; C. Clark Doughtery, Jr.

[57] ABSTRACT

Methods of acidizing a subterranean well formation, acidizing compositions and sequestering additives for preventing the precipitation of metal compounds in the formation.

12 Claims, No Drawings

ACIDIZING SUBTERRANEAN WELL FORMATIONS CONTAINING DEPOSITS OF METAL COMPOUNDS

In acidizing procedures for increasing the permeability of subterranean well formations, aqueous acid solutions are often used. For example, aqueous solutions of hydrochloric acid, hydrofluoric acid, formic acid, acetic acid and various mixtures of such acids are commonly utilized, with aqueous hydrochloric acid being the most commonly used acid solution. When the formation being acidized contains deposits of metal compounds such as iron compounds or clays containing aluminum compounds, the acid solution dissolves such deposits as well as other reactive substances contained in the formation, but upon becoming spent, iron and/or aluminum contained in the solution precipitate as hydroxides which can reduce the permeability of the treated formation.

In order to prevent the precipitation of metal compounds from spent acidizing solutions, sequestering additives have heretofore been utilized in the acidizing solutions. For example, acetic acid has been commonly used as a sequestering agent for iron and the like in spent aqueous hydrochloric acid solutions. U.S. Pat. No. 3,142,335 describes iron sequestering additives for use with hydrochloric acid solutions which are comprised of a mixture of citric acid, or a salt thereof, and a low molecular weight organic acid or salt thereof, such as acetic acid or formic acid.

By the present invention sequestering additives, acidizing compositions containing the additives and methods of acidizing subterranean well formations are provided which are more effective in preventing the precipitation of metal compounds in formations than the heretofore used additives, compositions and methods.

The sequestering additives of the present invention are comprised of a mixture of a first ingredient selected from the group consisting of levulinic acid, a salt of levulinic acid and mixtures thereof, and a second ingredient selected from the group consisting of citric acid, a salt of citric acid and mixtures thereof. The relative proportions of the ingredients can vary, but generally fall within a levulinic acid and/or salt thereof to citric acid and/or salt thereof weight ratio in the range of from about 5:1 to 1:5. The specific amount of each ingredient used in the additive depends on the metal compound content of the formation to be acidized and other factors, but the relative proportions of the ingredients are adjusted so that they are sufficient to prevent precipitation of metal compounds from a spent aqueous acid solution when added to the live solution in a given amount for a longer period of time than obtainable with like amounts of either ingredient alone.

The acidizing compositions of this invention for treating subterranean well formations containing metal compound deposits are comprised of an aqueous solution of one or more of the acids mentioned above and the above-described additive for sequestering metals. The total amount of the sequestering additive in the acidizing composition required to prevent precipitation of metal compounds from the composition after becoming spent in a subterranean formation varies with the concentration of metal in the spent solution. However, in most applications an additive concentration in the range of from about 10 pounds to about 400 pounds per 1,000 gallons of aqueous acid solution is sufficient. Preferably, the citric acid or salt thereof ingredient is combined with the acid solution in a solid state in an amount in the range of from about 10 to about 300 pounds per 1,000 gallons of the solution. The levulinic acid ingredient is preferably combined with the acid solution in an amount in the range of from about 0.2% to about 6% by volume of the solution. An equivalent amount of a salt of levulinic acid, preferably alkali metal or ammonium, can be utilized. Such amounts and proportions of ingredients are sufficient in most applications to prevent precipitation of iron and/or aluminum compounds from the acid composition after becoming spent in a subterranean well formation for a period of time sufficient to recover the spent composition from the formation.

The most preferred acidizing composition of this invention is an aqueous solution of hydrochloric acid and a levulinic acid-citric acid metal sequestering additive, the hydrochloric acid being present in the composition in an amount of about 15% by weight of the composition, the citric acid being present in the composition in an amount of about 50 pounds per 1,000 gallons of the composition and the levulinic acid being present in the composition in an amount of about 1% by volume of the composition.

As will be understood by those skilled in the art, other conventional well formation treating additives can be combined with the acidizing composition such as non-emulsifying agents, corrosion inhibitors, anti-sludging agents, fluid loss additives, etc.

In preparing the acidizing compositions, a corrosion inhibitor, if utilized, is first added to water in a mixing tank. The acid or mixture of acids used is next combined with the water in an amount sufficient to obtain a solution of desired acid concentration and mixed thoroughly. The levulinic acid or salt thereof is next combined with the acid solution followed by combining the citric acid or salt thereof with the solution. The resulting composition is mixed or agitated for a period of time sufficient to completely dissolve the sequestering additive ingredients followed by the addition of other conventional formation treating additives, if used.

Once the acidizing composition of this invention has been prepared as described above, it is introduced into a subterranean well formation to be acidized. The acidizing composition dissolves deposits of metal compounds as well as other reactive substances in the formation and maintains the metals in solution after becoming spent for a period of time sufficient to recover the spent composition, i.e., the spent composition is recovered from the subterranean formation by producing the formation, by driving the spent composition through the formation to a recovery well, or by driving the spent composition over such a wide area that any precipitate that forms cannot have a detrimental effect.

The following examples are given to further illustrate the present invention.

EXAMPLE 1

Laboratory tests are conducted to compare the iron sequestering ability of various sequestering additives of this invention. Samples of 15% by weight aqueous hydrochloric acid solutions containing various concentrations of iron ($Fe^{+++}$) in solution are prepared. Levulinic acid-citric acid sequestering additives having proportions of ingredients given in Table I below are combined with the aqueous acid solutions, and the resultant compositions are reacted with calcite in containers until spent. The spent compositions in the containers are covered and allowed to stand in contact with excess calcite at atmospheric pressure and room temperature until precipitation of iron hydroxide occurs. The times required for the precipitation of iron hydroxide from the spent compositions are shown in Table I below.

containing more than about 5000 milligrams of iron per liter, the additives of this invention are more effective in the prevention of precipitation than like amounts of levulinic acid or citric acid alone.

TABLE I

COMPARISON OF PRECIPITATION TIMES OF SPENT AQUEOUS HYDROCHLORIC ACID CONTAINING VARIOUS CONCENTRATIONS OF IRON (Fe+++) AND VARIOUS LEVULINIC ACID-CITRIC ACID SEQUESTERING ADDITIVES

| | | | PRECIPITATION TIME VS IRON CONCENTRATION | | | | |
|---|---|---|---|---|---|---|---|
| Solution | Levulinic Acid Concentration, Pounds per 1,000 Gallons of Solution | Citric Acid Concentration, Pounds per 1,000 Gallons of Solution | 2500 Milligrams Per Liter (Fe+++) | 5000 Milligrams Per Liter (Fe+++) | 7500 Milligrams Per Liter (Fe+++) | 10,000 Milligrams Per Liter (Fe+++) | 12,500 Milligrams Per Liter (Fe+++) |
| 1 | 150 | 0 | 12 HRS | 0.5 HRS | 0.5 HRS | 0.5 HRS | 0.5 HRS |
| 2 | 125 | 25 | 170 HRS | 170 HRS | 170 HRS | 170 HRS | 0.5 HRS |
| 3 | 100 | 50 | 170 HRS | 170 HRS | 170 HRS | 170 HRS | 0.5 HRS |
| 4 | 75 | 75 | 170 HRS | 170 HRS | 170 HRS | 170 HRS | 0.5 HRS |
| 5 | 50 | 100 | 170 HRS | 170 HRS | 170 HRS | 0.5 HRS | 0.5 HRS |
| 6 | 25 | 125 | 170 HRS | 170 HRS | 170 HRS | 0.5 HRS | 0.5 HRS |
| 7 | 0 | 150 | 170 HRS | 170 HRS | 0.5 HRS | 0.5 HRS | 0.5 HRS |

From Table 1 it can be seen that the levulinic acid-citric acid sequestering additives of the present invention can prevent, for at least 170 hours, the precipitation of iron compounds from spent aqueous hydrochloric acid solutions containing up to 10,000 milligrams of iron per liter of solution and that for spent acid solutions

EXAMPLE 2

The laboratory procedure set forth in Example 1 is repeated using levulinic acid alone, acetic acid alone, mixtures of levulinic and citric acids and mixtures of acetic and citric acids as sequestering additives. The results of these tests are set forth in Table II below.

TABLE II

COMPARISON OF PRECIPITATION TIMES OF SPENT AQUEOUS HYDROCHLORIC ACID CONTAINING VARIOUS CONCENTRATIONS OF IRON (Fe+++) AND VARIOUS SEQUESTERING ADDITIVES

PRECIPITATION TIME VS. IRON CONCENTRATION

| Solution | Levulinic Acid, % by Volume of Solution | Citric Acid, Lbs. per 1,000 Gallons of Solution | Acetic Acid, % by Volume of Solution | 2000 Milligrams per Liter (Fe+++) | 4000 Milligrams per Liter (Fe+++) | 6000 Milligrams per Liter (Fe+++) | 8000 Milligrams per Liter (Fe+++) | 10,000 Milligrams per Liter (Fe+++) | 15,000 Milligrams per Liter (Fe+++) | 20,000 Milligrams per Liter (Fe+++) | 25,000 Milligrams per Liter (Fe+++) | 30,000 Milligrams per Liter (Fe+++) | 40,000 Milligrams per Liter (Fe+++) | 50,000 Milligrams per Liter (Fe+++) | 60,000 Milligrams per Liter (Fe+++) |
|---|---|---|---|---|---|---|---|---|---|---|---|---|---|---|---|
| 1 | 2.0 | 0 | 0 | 72 HRS | 48 HRS | 24 HRS | 16 HRS | 0.5 HRS | — | — | — | — | — | — | — |
| 2 | 0 | 0 | 2.0 | 24 HRS | 24 HRS | 12 HRS | 6 HRS | 2 HRS | — | — | — | — | — | — | — |
| 3 | 1.0 | 50 | 0 | — | — | — | — | — | 720 HRS | 144 HRS | 0.5 HRS | — | — | — | — |
| 4 | 0 | 50 | 1.0 | — | — | — | — | — | 720 HRS | 192 HRS | 18 HRS | 0.5 HRS | — | — | — |
| 5 | 2.0 | 100 | 0 | — | — | — | — | — | — | — | — | — | 720 HRS | 720 HRS | 0.5 HRS |
| 6 | 0 | 100 | 2.0 | — | — | — | — | — | — | — | — | — | 720 HRS | 192 HRS | HRS |

From Table II it can be seen that for iron concentrations of up to 8000 milligrams per liter that levulinic acid alone is more effective as an iron sequestering additive in a spent hydrochloric acid solution than acetic acid alone. In spent solutions containing iron concentrations of up to an amount in excess of about 20,000 milligrams per liter it can be seen that the sequestering additive of this invention is quite effective in preventing precipitation, but that for iron concentrations of greater than about 15,000 to an amount less than about 30,000 milligrams per liter, a sequestering additive comprised of citric acid and acetic acid is more effective than the sequestering additive of the present invention. However, at iron concentrations of from about 40,000 to an amount in excess of about 50,000 milligrams per liter, the levulinic acid-citric acid sequestering additive of the present invention is at least equal to and in some instances is more effective in preventing iron compound precipitation than an acetic acid-citric acid sequestering additive.

What is claimed is:

1. A sequestering additive for use in aqueous acid solutions to prevent the precipitation of metal compounds therefrom after being spent said sequestering additive being comprised of a mixture of a first ingredient selected from the group consisting of levulinic acid, a salt of levulinic acid and mixtures thereof, and a second ingredient selected from the group consisting of citric acid, a salt of citric acid and mixtures thereof wherein the weight ratio of said first ingredient to said second ingredient is in the range of from about 5:1 to about 1:5.

2. The sequestering additive of claim 1 wherein said first ingredient is levulinic acid and said second ingredient is citric acid, the relative proportions of said ingredients being sufficient to prevent precipitation of metal compounds from spent aqueous acid solutions when added to the live solutions in a given amount for a longer period of time than obtainable with like amounts of either of said ingredients alone.

3. An acidizing composition for treating subterranean well formations containing deposits of iron compounds comprising an aqueous solution of hydrochloric acid and an iron sequestering additive, said iron sequestering additive being comprised of a mixture of a first ingredient selected from the group consisting of levulinic acid, a salt of levulinic acid and mixtures thereof and a second ingredient selected from the group consisting of citric acid, a salt of citric acid and mixtures thereof wherein the weight ratio of said first ingredient to said second ingredient is in the range of from about 5:1 to about 1:5.

4. The acidizing composition of claim 3 wherein said sequestering additive is comprised of a mixture of levulinic acid and citric acid, the amounts and relative proportions of said ingredients being sufficient to prevent precipitation of iron compounds from said composition upon becoming spent for a longer period of time than is obtainable with a like amount of either ingredient alone.

5. The composition of claim 3 wherein said iron sequestering additive is present in said composition in an amount in the range of from about 10 to about 400 pounds per 1000 gallons of said aqueous hydrochloric acid.

6. An acidizing composition for treating subterranean well formations containing deposits of iron compounds comprising an aqueous solution of hydrochloric acid and an iron sequestering additive, said iron sequestering additive being comprised of a mixture of levulinic acid and citric acid, wherein said levulinic acid is present in said composition in an amount in the range of from about 0.2% to about 6% by volume of said aqueous hydrochloric acid solution, and said citric acid is present in said composition in an amount in the range of from about 10 pounds to about 300 pounds per 1000 gallons of said aqueous hydrochloric acid solution.

7. The acidizing composition of claim 6 wherein said hydrochloric acid is present in said composition in an amount of about 15% by weight of said composition, said levulinic acid is present in said composition in an amount of about 1% by volume of said composition and said citric acid is present in said composition in an amount of about 50 pounds per 1000 gallons of said composition.

8. A method of acidizing a subterranean well formation containing deposits of metal compounds comprising the steps of:
combining a metal sequestering additive with an aqueous acid solution in an amount sufficient to prevent precipitation of metal compounds from said acid solution upon becoming spent for a period of time sufficient to recover said solution from the subterranean well formation, said sequestering additive being comprised of a mixture of a first ingredient selected from the group consisting of levulinic acid, a salt of levulinic acid and mixtures thereof, and a second ingredient selected from the group consisting of citric acid, a salt of citric acid and mixtures thereof wherein the weight ratio of said first ingredient to said second ingredient is in the range of from about 5:1 to about 1:5;
introducing said aqueous acid solution containing said sequestering additive into said formation; and
recovering said solution from said formation after it has become spent but before metal compounds are precipitated therefrom.

9. The method of claim 8 wherein said first sequestering additive ingredient is levulinic acid and said second ingredient is citric acid, the relative proportions of said ingredients being sufficient to prevent precipitation of metal compounds from said aqueous acid solution after becoming spent when added to the live aqueous acid solution in a given amount for a longer period of time than is obtainable with like amounts of either of said ingredients alone.

10. The method of claim 8 wherein said iron sequestering additive is present in said composition in an amount in the range of from about 10 to about 400 pounds per 1000 gallons of said aqueous hydrochloric acid.

11. A method of acidizing a subterranean well formation containing deposits of metal compounds comprising the steps of:
combining a metal sequestering additive with an aqueous acid solution in an amount sufficient to prevent precipitation of metal compounds from said acid solution upon becoming spent for a period of time sufficient to recover said solution from the subterranean well formation, said sequestering additive being comprised of a mixture of levulinic acid and citric acid wherein said levulinic acid is combined with said aqueous acid solution in an amount in the range of from about 0.2% to about 6% by volume of said acid solution, and said citric acid is combined with said solution in an amount in the range of from about 10 pounds to about 300 pounds per 1000 gallons of said solution;
introducing said aqueous acid solution containing said sequestering additive into said formation; and
recovering said solution from said formation after it has become spent but before metal compounds are precipitated therefrom.

12. The method of claim 11 wherein said acid in said aqueous acid solution is hydrochloric acid present in an amount of about 15% by weight of said solution, said levulinic acid is combined therewith in an amount of about 1% by volume of said solution, and said citric acid is combined with said solution in an amount of about 50 pounds per 1000 gallons of said solution.

* * * * *

UNITED STATES PATENT AND TRADEMARK OFFICE
CERTIFICATE OF CORRECTION

PATENT NO.   : 4,151,098
DATED        : April 24, 1979
INVENTOR(S)  : Walter R. Dill and John A. Knox It is certified that error appears in the above-identified patent and that said Letters Patent are hereby corrected as shown below:

Column 5, Table II, under the columnar heading "60,000 Milligrams Per Liter (Fe+++)," for Solution 6, delete [HRS] and insert therefor --60 HRS--.

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*